United States Patent
d'Ursel

(10) Patent No.: US 6,483,534 B1
(45) Date of Patent: Nov. 19, 2002

(54) STEREOSCOPIC IMAGE PRODUCTION METHOD AND DEVICE FOR IMPLEMENTING SAME

(76) Inventor: Wauthier d'Ursel, drève de Bonne Odeur 1, B-1170 Brussels (BE)

( * ) Notice: Subject to any disclaimer, the term of this patent is extended or adjusted under 35 U.S.C. 154(b) by 0 days.

(21) Appl. No.: 09/424,450
(22) PCT Filed: May 12, 1998
(86) PCT No.: PCT/BE98/00065
§ 371 (c)(1),
(2), (4) Date: Nov. 23, 1999
(87) PCT Pub. No.: WO98/53358
PCT Pub. Date: Nov. 26, 1998

(30) Foreign Application Priority Data

May 23, 1997 (BE) ............................................ 09700456

(51) Int. Cl.[7] .......................... H04N 13/02; H04N 15/00
(52) U.S. Cl. .............................. 348/46; 348/49; 348/40; 348/54
(58) Field of Search .............................. 348/46, 49, 40, 348/54; 359/462, 464, 463, 619; 250/208.1

(56) References Cited

U.S. PATENT DOCUMENTS

| | | | |
|---|---|---|---|
| 3,802,769 A | | 4/1974 | Rotz et al. |
| 4,597,634 A | | 7/1986 | Steenblik |
| 5,111,313 A | | 5/1992 | Shires |
| 5,132,839 A | * | 7/1992 | Travis ........................ 359/462 |
| 5,223,703 A | * | 6/1993 | Setani ........................ 250/208 |
| 5,379,133 A | | 1/1995 | Kirk |
| 5,719,620 A | * | 2/1998 | Allio ........................... 348/49 |
| 5,930,037 A | * | 7/1999 | Imai ............................ 359/463 |
| 6,014,259 A | * | 1/2000 | Wohlstadter ................ 359/619 |
| 6,061,179 A | * | 5/2000 | Inoguchi ..................... 359/464 |

FOREIGN PATENT DOCUMENTS

JP        03025490        4/1991

* cited by examiner

*Primary Examiner*—Chris Kelley
*Assistant Examiner*—Charles Parsons
(74) *Attorney, Agent, or Firm*—Venable; George H. Spencer; Ashley J. Wells

(57) ABSTRACT

A device and a method for producing a stereoscopic image with horizontal parallax including diffracting electromagnetic rays emitted by an object to provide a first dispersion of dispersed electromagnetic rays in which a lateral deviation of the rays emitted by the object is obtained in a first deviation direction; collecting at least part of the dispersed electromagnetic rays by shooting the object with at least one lens to provide an image; projecting the image through at least one screen facility; and diffracting electromagnetic rays emitted during projection to provide a second dispersion and scattering the second dispersion by the at least one screen facility to form a stereoscopic image of the object in which a lateral deviation of the rays emitted during projection is obtained in a second deviation direction.

36 Claims, 13 Drawing Sheets

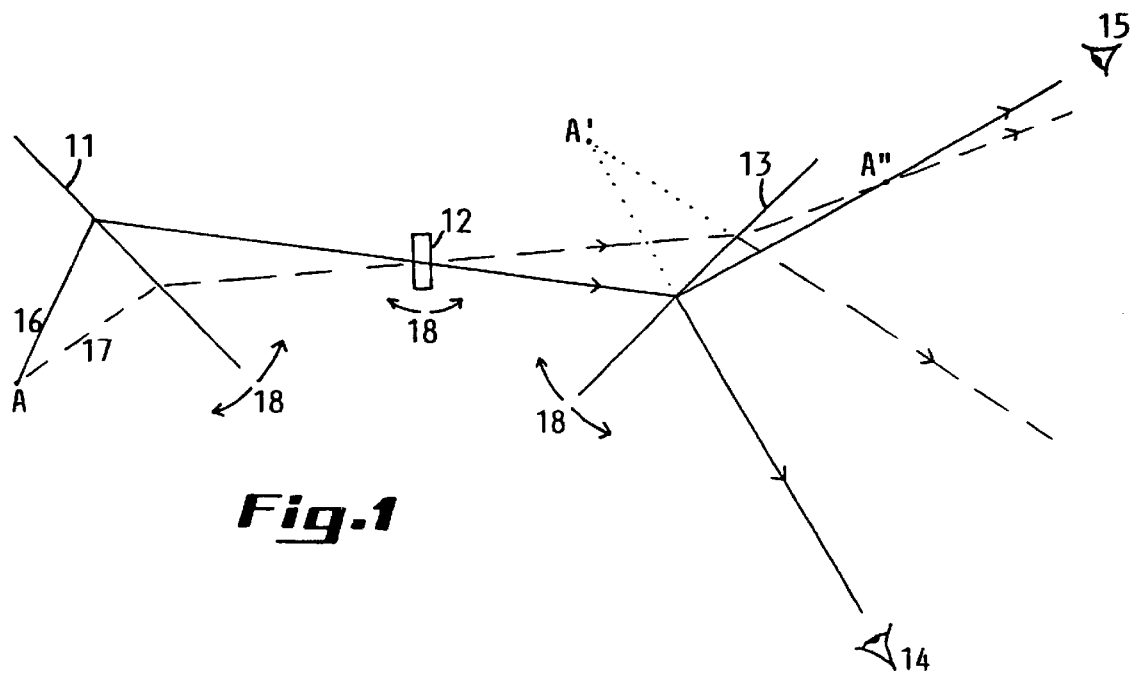
Fig.1
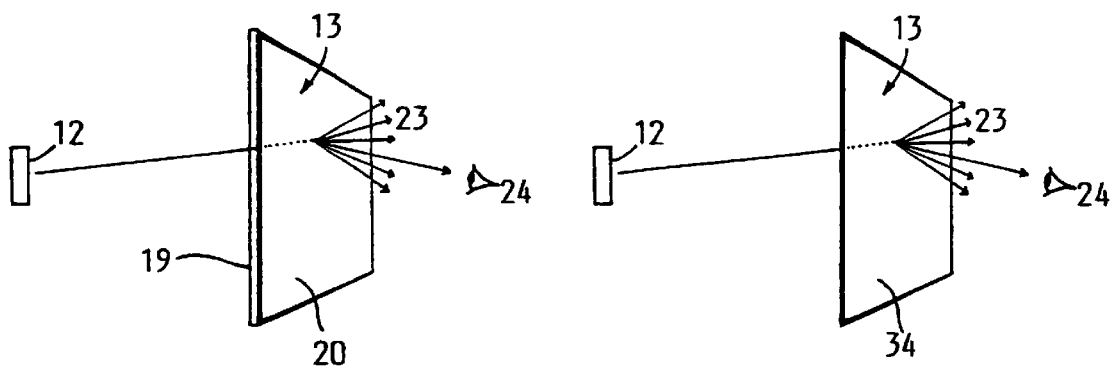
Fig.2a  Fig.2b

STEREOSCOPIC IMAGE PRODUCTION METHOD AND DEVICE FOR IMPLEMENTING SAME

BACKGROUND OF THE INVENTION

FIELD OF THE INVENTION

The present invention relates to a method for producing stereoscopic images and a device for implementing this method, together with a screen and an image data storage medium to be used in such a method.

Many techniques have been developed to produce images in three dimensions. Methods requiring the wearing of spectacles make it possible to transmit to each eye of the observer the image intended for it. Mention may be made, for example, of anaglyphs, polarised spectacles and liquid crystal spectacles. In projection booths equipped for the use of such methods, all the viewers, whatever their position, see the object at the same angle. It is still impossible to see either side of the filmed object by moving in front of the screen.

A known system with a lens grating enables the viewer to perceive the stereoscopic effect without wearing spectacles or without using a stereoscopic device. Although the grating avoids the need to wear spectacles, it does not lack other disadvantages. Firstly, it must be perfectly adjusted as regards the images formed behind the lens faces, and the viewer must hardly move during observation or else the image and the stereoscopic effect may no longer be seen. The field of view is limited.

Holography makes it possible to reconstruct the view of a volume perfectly but requires the use of coherent light. Moreover, the volume of the objects being shot is limited. Another drawback of this method lies in the fact that it is impossible to project a hologram.

Other methods, such as the 3D Volumetric Display System (H-P PENEL, L'ère de la nouvelle Dimension, Science et Vie, 928, 1995, pp. 68–72) and that described in U.S. Pat. No. 5,111,313, enable animated stereoscopic images to be projected on to a screen but require the use of a coherent light source, and the cylindrical shape of the screen limits the size of the images obtained. Moreover, the deviation of the light rays is achieved by the movement of certain mechanical components, which requires a sophisticated electronic control system.

The aim of the present invention is to avoid the disadvantages of the methods and devices of the prior art, and to devise an improved method enabling complete stereoscopic images to be obtained, with horizontal parallax, from objects of any dimensions, particularly in such a way that the viewer is able to move while perceiving the stereoscopic nature of the image produced.

SUMMARY OF THE INVENTION

To solve these problems, according to the invention, a method is used for producing stereoscopic images with horizontal parallax comprising:
  a first dispersion by diffraction of electromagnetic rays emitted by an object,
  the shooting of the object using at least one lens capable of collecting at least part of the said dispersed electromagnetic rays,
  a projection of the shot through a screen facility, and
  a second dispersion and a scattering, by the screen facility, of electromagnetic rays emitted during the projection, with the formation of stereoscopic images of the object, the first and second dispersions producing a lateral deviation of corresponding emitted rays. The invention thus exploits the spectral composition of the sources of radiation and uses the unlimited number of wavelengths contained in a spectral range to obtain as many viewing angles of the same object as there are wavelengths. The method according to the invention makes it possible to produce complete stereoscopic images with horizontal parallax and images that may be coloured. It should be noted that the deviation of light rays through optical components is obtained without movement of the said components. It is unnecessary to use either a sophisticated electronic control system or a coherent light source. The invention allows the shooting of animated objects of unlimited size and under ordinary light. The projection on to a screen, even of large dimensions, makes it possible to change at will the size of the stereoscopic image to be produced.

According to one embodiment of the invention, the second dispersion comprises a lateral deviation of the projected rays in the same direction as, or in the opposite direction to, the lateral deviation of the first dispersion. The method according to the invention thus makes it possible to produce an orthoscopic or pseudoscopic stereoscopic image.

According to another embodiment of the invention, the aforesaid projection is carried out by the aforesaid lens. The method thus allows the direct projection, through a screen, of a stereoscopic image of the object to be viewed.

According to an advantageous embodiment of the invention, the method comprises the reception of image data, obtained during the shooting, on at least one data storage medium, allowing the said projection to be performed later. This reception may, for example, be the sensitisation of a silver-based photosensitive medium permitting projection, or else a recording on a storage medium that may, for example, be electronic. In the latter case, it is generally possible to convert the data into digital form: the main advantage conferred by the digital form lies in the data processing, for example to create special effects or synthetic images.

According to yet another embodiment of the invention, the method comprises an adjustment of the spatial separation between the stereoscopic image and the screen facility by inserting in the various steps of the method at least one additional dispersion of rays by diffraction, with additional lateral deviation. The volume of the image may thus be displaced in the forward-backward direction with respect to the screen.

Details and special features of embodiments of the method according to the invention are indicated in the appended claims 1 to 15.

The invention also relates to a device for producing stereoscopic images.

According to one embodiment, this device comprises:
  a first diffraction grating providing for a first dispersion of electromagnetic rays emitted by the object with lateral deviation of the said rays,
  a lens capable of collecting at least a part of the dispersed electromagnetic rays, and
  a screen facility through which the electromagnetic rays coming from the lens undergo a second dispersion with lateral deviation and scattering. Such a device enables the shooting and projection of the stereoscopic image to be performed simultaneously.

According to another embodiment, the device according to the invention comprises:
  a first diffraction grating providing for a first dispersion of electromagnetic rays emitted by the object with lateral deviation of the said rays, at least one lens capable of collecting at least a part of the dispersed electromagnetic rays, at least one medium for storing image data capable of receiving the electromagnetic rays collected by the lens or lenses, and later of making possible a projection, through at least one projection lens, of image data transmitted by these collected electromagnetic rays, and a screen facility through which the electromagnetic rays coming from the projection lens or lenses undergo a second dispersion with lateral deviation and scattering. Such a device makes possible the reception of image data on one or more storage media and the subsequent projection on to the screen of the stereoscopic image obtained by the method according to the invention.

Details and special features of embodiments of the device according to the invention are indicated in claims 16 to 27.

The invention also relates to a screen and a storage medium for image data to be used in the method according to the invention.

BRIEF DESCRIPTION OF THE DRAWINGS

Other details of the invention will emerge from the description given below, with reference to the appended drawings which illustrate non-limiting examples of the invention.

FIG. 1 is a schematic plan view of a first application of the present invention, making it possible to produce a stereoscopic image without an image data storage medium.

FIGS. 2a and 2b are lateral elevations in perspective of the lens and two variants of the screen used in the application illustrated in FIG. 1.

Figure 3:
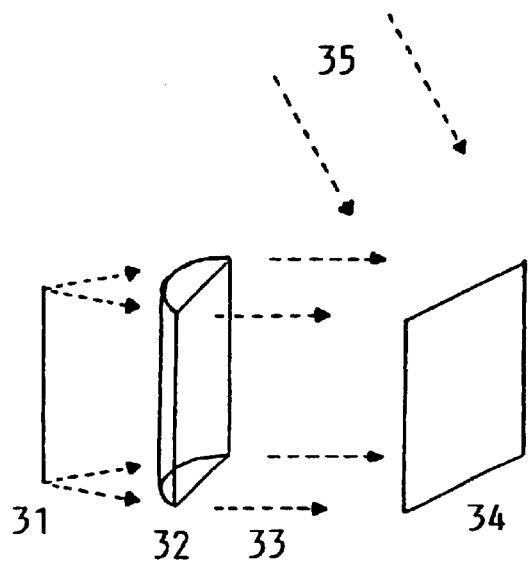
FIGS. 3 and 4 are perspective views of two optical systems for producing a holographic screen according to the present invention.

In the various drawings, identical or analogous elements are indicated by the same reference numbers. It should be understood that these drawings are schematic, that they are not drawn to scale, and that the elements are frequently shown widely separated from each other to allow the optical phenomena to be more clearly understood.

The invention applies to electromagnetic rays generally, even if the examples proposed are located in the visible range of the spectrum.

According to the invention as illustrated in FIG. 1, a shot of an object A is obtained through at least one diffraction grating 11 which performs the function of dispersion around parallel dispersion axes, in other words the electromagnetic rays are diverted laterally, as a function of the wavelength.

It must be appreciated that, according to the invention, all the optical elements and functions of the invention are oriented in relation to the vertical direction of the stereoscopic image that is to be obtained. The dispersion and scattering functions are oriented in relation to the viewer's binocular vision.

The grating 11 is preferably made up of parallel straight lines/fringes that are equidistant and arranged parallel to the said dispersion axes. Any other laterally deviating grating is suitable for the invention, but if the lines/fringes are disposed in a way different from that described, the stereoscopic image obtained will reveal some deformation. Diffraction gratings of this kind are well known in the art and are easily available; they will therefore not be described in more detail. In the context of this invention, one could for example use thick diffraction gratings (in volume terms), which have better diffraction performance. The zero-order beam of gratings of this kind is highly attenuated (according to BRAGG's law of diffraction).

Thanks to the deviation obtained as a function of the wavelength (dispersion), shooting enables an unlimited number of points of view of object A to be obtained, with one point of view per wavelength, building up in this way a composite image consisting of as many constituent elements as there are wavelengths and offering a vast number of perspectives.

The difference in the viewing angle between two wavelengths is to an increasing extent a function of the distance between the lens 12 and the grating 11 referred to as the "primary" and of the dispersion obtained by the said grating.

Each point on the object projects its own succession of homologous points, resulting from the spectral composition of the emitted rays.

FIG. 1 shows two viewing angles 16 and 17 for a point on object A. In the device illustrated in this figure, the elements forming the image that is obtained are directly projected by the shooting lens 12 on to a screen 13 through which a viewer 14 or 15 may look at the stereoscopic image A' or A" produced. The lens 12 thus also serves here as the projection lens.

According to the invention, the screen 13 performs both a dispersion function and a scattering function 23.

As can be seen from FIG. 1, it is possible to choose a screen 13 whose dispersion produces a lateral deviation in the same direction as the dispersion produced by the grating 11, and an orthoscopic stereoscopic image A' is then obtained in this case. When the deviation by the screen 13 takes place in the opposite direction, a pseudoscopic stereoscopic image A" is obtained in this case.

The orientation of the optical components used, 11, 12 and 13, may be selected, since they can normally be arranged to be capable of pivoting, according to the arrows 18, about rotation axes perpendicular to the plane of the drawing in FIG. 1.

The scattering, illustrated in FIGS. 2a and 2b, occurs at each point of the screen and makes it possible to see the stereoscopic image when the viewer moves vertically.

The dispersion splits the light into a spectrum. Consequently, whatever its position, the eye receives, for each point of the screen, only one wavelength coming from a projection light source. By changing the viewing angle horizontally, the points of the stereoscopic image obtained from this source pass successively through all the colours of the spectrum.

The degree of stereoscopy in the image obtained on the screen 13 is a decreasing function of the dispersion by the said screen. It is therefore possible to increase or decrease the parallax at will depending on the dispersive power chosen.

According to a variant of the embodiment of the screen in conformity with the invention, illustrated in FIG. 2a, the following are placed in the optical path of the projection: on the one hand, a grating 19 performing a function of dispersion about parallel dispersion axes with lateral deviation, such as that for example required for shooting, and, on the other hand, a scattering component 20 performing a function of scattering, oriented along a direction perpendicular to the orientation of the dispersion. The respective positions of the grating 19 and the scattering component 20 are chosen according to the focusing to be achieved, and these elements can therefore be moved with respect to each other in an adjustable way. This scattering of the transmitted rays is obtained, for example, by a lineal scatterer, i.e. one consisting of parallel straight grooves oriented in a direction perpendicular to the dispersion axes of the grating 19, which is known in the art and which will therefore not be described in more detail (see for example, G SAXBY, Hologrammes, Masson, 1984, p. 129). In this variant, the dispersion and the scattering are produced successively.

According to another variant of the embodiment of the screen, a transmitted-light hologram 34 is used, which provides for the two functions simultaneously. This holographic optical element (HOE) forms the screen represented in FIG. 2B.

Figure 4:
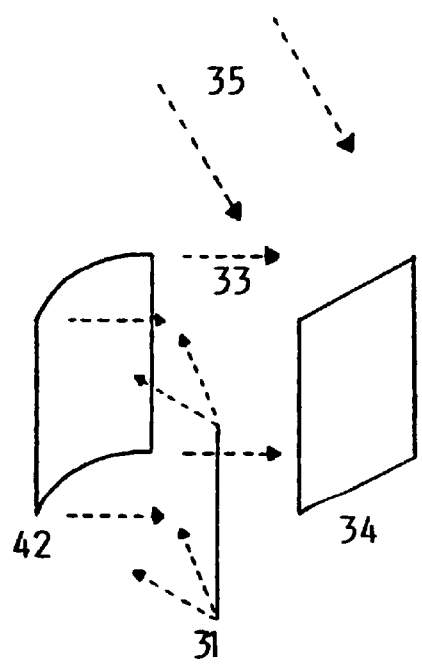

The hologram of the invention is produced according to holographic principles well known to one skilled in the art. The object beam and reference beam are oriented with respect to the vertical direction of the hologram to be produced. The reference beam 35 (see FIGS. 3 and 4) of the hologram 34 is collimated and forms with the object beam 33 a horizontal angle (horizontal angular deviation). The object beam is obtained by placing a luminous vertical line 31 at a distance equal to the focal length from a lens producing collimation in the horizontal direction (a cylindrical convergent lens with vertical axis) 32 (FIG. 3) or from a mirror producing collimation in the horizontal direction (parabolic mirror convergent in the horizontal direction) 42 (FIG. 4).

The production of a hologram of a luminous line to obtain the scattering function in the vertical direction at the reconstruction is described in the patent U.S. Pat. No. 5,111,313, although the form of the hologram is different and the reference beam is oriented differently in this document. According to the invention, in fact, the hologram 34 is produced on a flat surface (see FIGS. 3 and 4). The hologram according to the invention produces either wholly or partly an image of a vertical line when there is a horizontal angle between the reconstruction beam and the image beam. As described in the aforesaid U.S. patent, the luminous line is an illuminated linear object or a luminous line produced on a scattering surface. The vertical scattering of the screen depends on the length of the luminous line. Its width must be as small as possible to avoid horizontal scattering. At the reconstruction, the hologram is that of a luminous line located at infinity.

Each point on the holographic screen according to the present invention therefore produces, for each wavelength, the image of a luminous line. As soon as the hologram is produced, copies of it may easily be obtained by known techniques.

Because of its function of producing lateral dispersion, the screen acts like a complex lens which deflects each ray by an amount depending on the wavelength and, by focusing the rays or making them diverge, reconstructs each point of the stereoscopic image, the information from which is transmitted from a line of this screen.

According to another device of the invention, the elements forming the image are received on an image data storage medium. For example, they are stored on a photosensitive medium 53 (see FIG. 5) and they are then projected (FIG. 6) from the medium 53 on to the screen 13.

Figure 6:
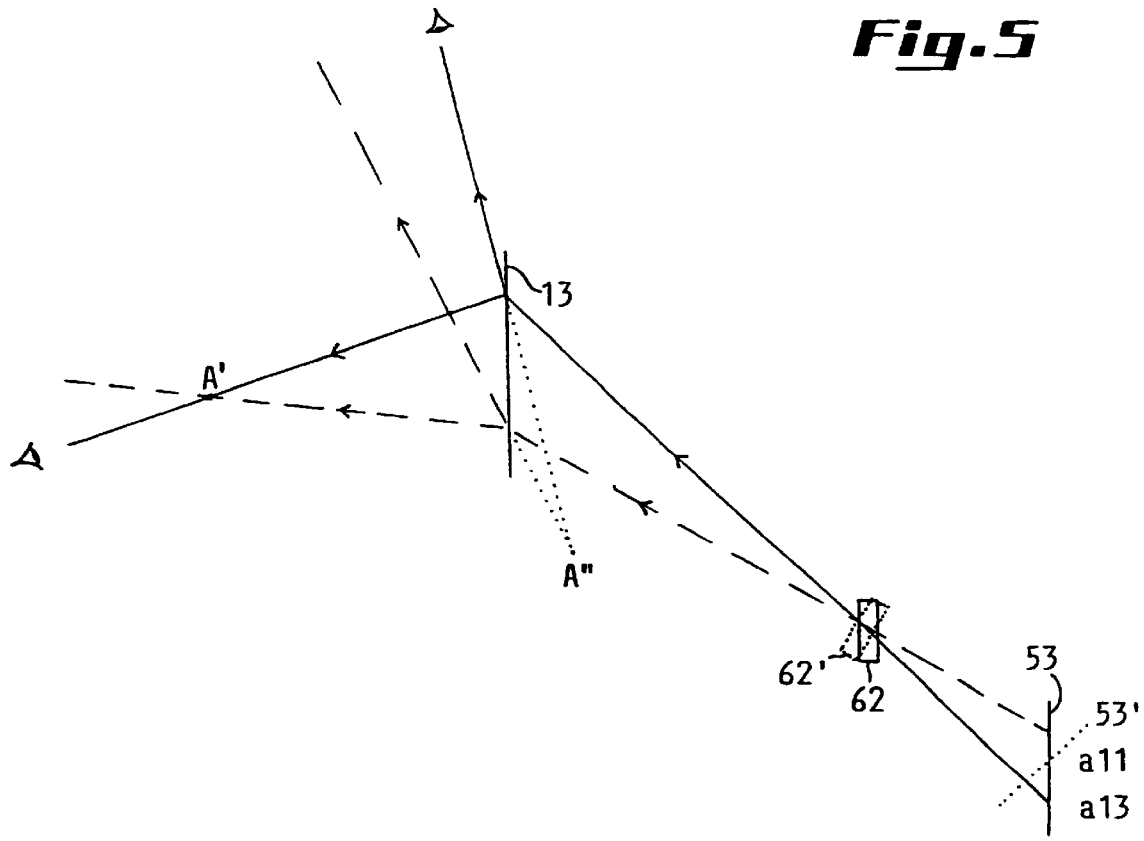
FIG. 6 is a plan view of a primary projection with the image data storage system of FIG. 5.

FIG. 6 represents only the points A' and A" of the stereoscopic image.

According to the invention, the medium 53 is acted on separately by each constitutive element of the image, and hence by each wavelength, which cannot be achieved with existing photosensitive media. Such media are not capable of carrying out a selection of the various radiations as required by the storage medium in the invention.

The reception of the information on the storage medium requires the capability of treating each wavelength separately, using a storage medium allowing projection by dividing the image into portions whose number is chosen in terms of the desired definition of the stereoscopic image and by sensitising the storage medium at different places for each wavelength in each portion of the image, forming a spectrogram of it. Each spectrogram is thus formed by as many elementary images as the spectrogram comprises wavelengths, with one elementary image per wavelength: the storage medium performs a spectral analysis.

Figure 5:
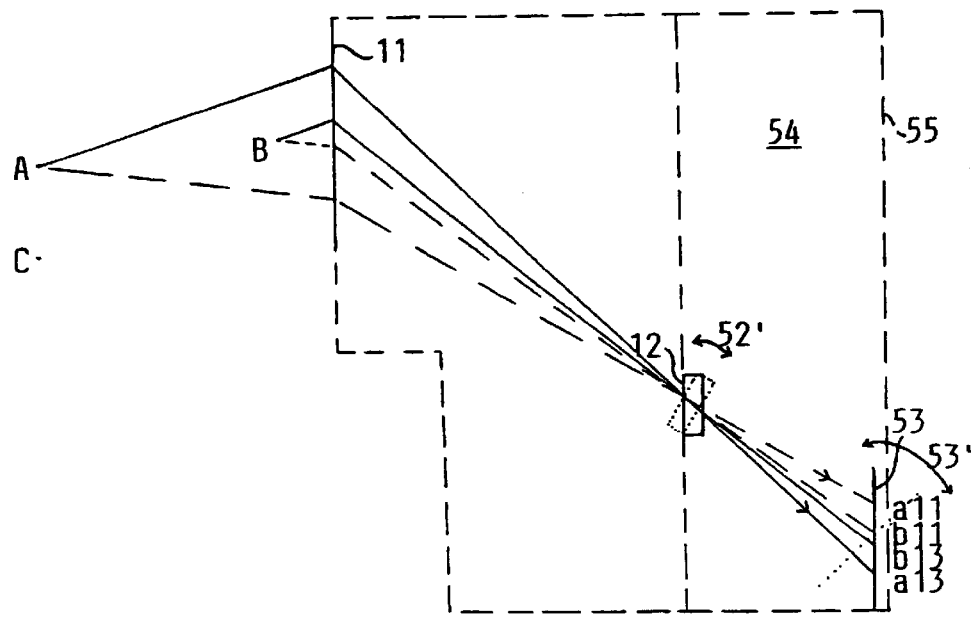
FIG. 5 is a plan view of a primary shooting with an image data storage system according to the invention.

To form the elementary images, at least two functions are performed upstream from the photosensitive layer 76 (see FIGS. 7a, 7b, 8a and 8b): a function of dispersion and a function of focusing the electromagnetic rays 71 projected, for example, to the back of the lightproof casing 54 of the image recording equipment 55 represented schematically by broken lines in FIG. 5.

Four variants of the storage medium according to the invention are illustrated here as non-limiting examples. According to a first variant, the image storage medium 53 comprises, per image portion, a cylindrical convergent refracting lens 79 which is combined, upstream or downstream from it, with a grating 72 performing the function of dispersion with lateral deflection of rays about parallel dispersion axes. The lens 79 has an axis parallel to these dispersion axes and hence the functions of convergence and dispersion have the same orientation. The photosensitive layer 76 is placed downstream so as to focus the rays to form elementary images on it. The grating 72 used may be similar to that 11 through which the shooting is carried out. Only two or three elementary images are represented (73, 74 and 75).

Figure 7A:
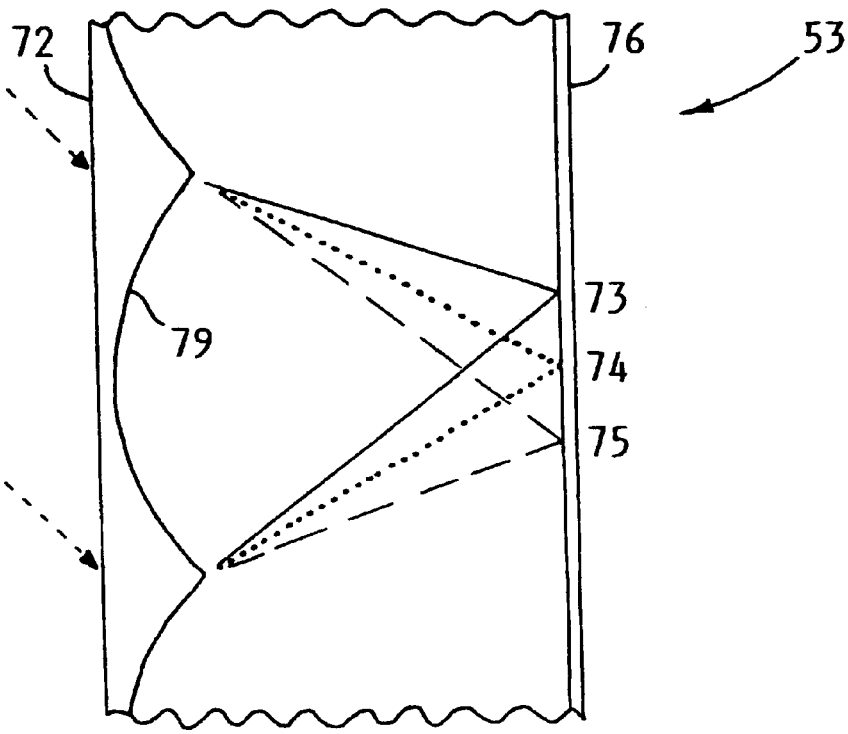
FIGS. 7a, 7b, 8a and 8b are cross-sectional views of variants of the image data storage system used in this invention during the shooting.
Figure 7B:
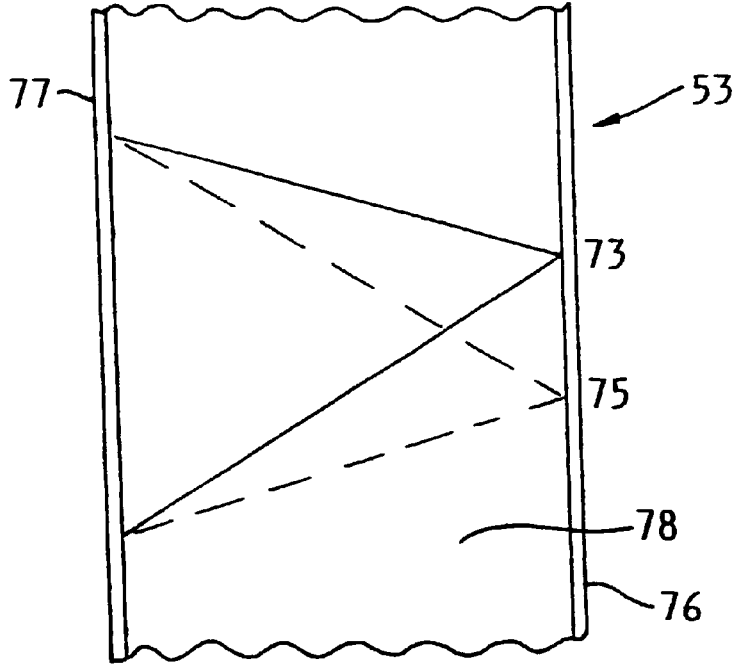

According to another variant of the storage medium according to the invention, illustrated in FIG. 7b, a convergent diffracting lens 77, placed upstream from the photosensitive layer, provides the two functions. This lens is a diffraction grating producing dispersion, to the same side, about parallel dispersion axes while focusing the rays in the direction perpendicular to these dispersion axes. Holography makes it possible to produce this type of lens easily. An example of how such a lens is produced may be obtained from the assembly illustrated in FIG. 91, p. 164 of the book "Hologrammes" by Graham Saxby, Masson, 1984, where the two beams have also been collimated in the direction perpendicular to the plane of the drawing in this figure. To support this lens 77, a transparent layer 78 is placed between it and the photosensitive layer 76.

According to two other variants of the invention (FIGS. 8a and 8b), a prism 81 is added in each portion of the storage medium. This performs two functions: a function of dispersion on the side opposite the dispersion with lateral deviation described in the first two variants, in order that the downstream deviation may attenuate or rectify the upstream deviation.

Figure 8A:
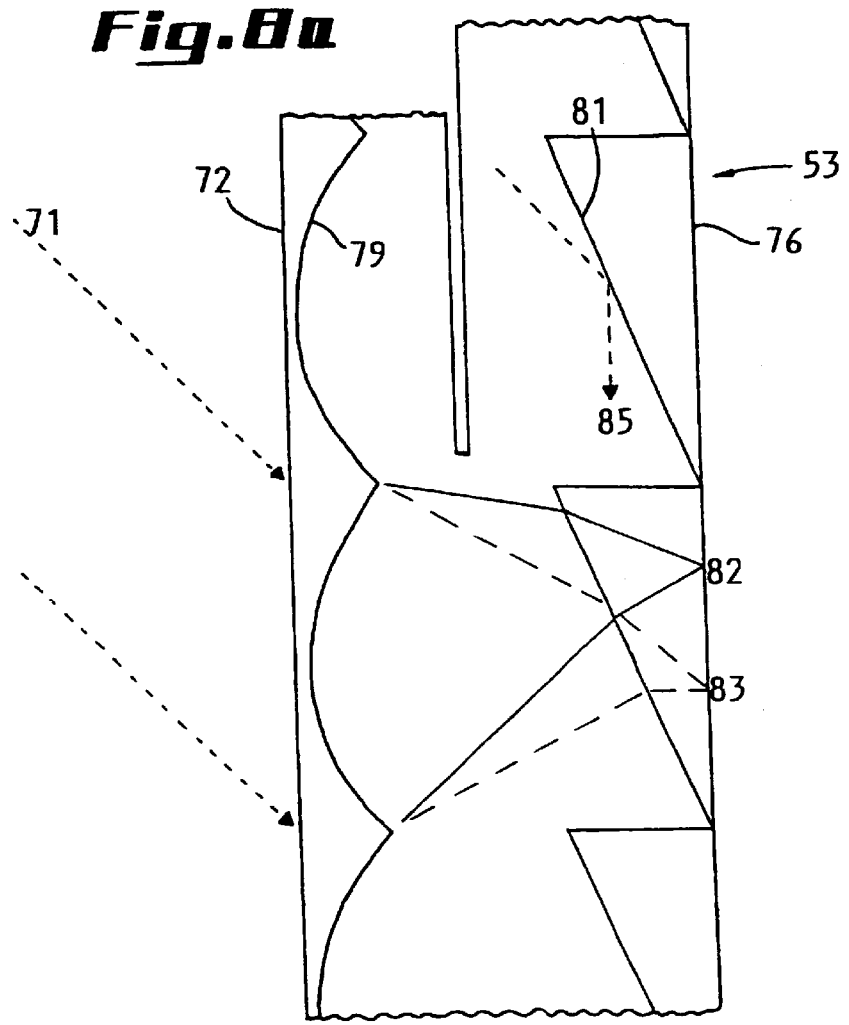

This provides a greater capacity for deviation by diffraction. Moreover, refraction by the prism 81 deviates short wavelengths more strongly and this additional dispersion increases the separation of the elementary images 82 and 83. This greater separation improves the quality of the parallax obtained. The prism also performs a function of reflection 85 of rays of zero order whose angle of incidence on the downstream face of the prism is greater than the critical angle of total reflection. A ray 85, shown in FIG. 8a, is undergoing this reflection. The three optical components, the grating 72, the lens 79 and the prism 81 are arranged from upstream to downstream depending on the desired order. The prism 81 must be downstream from the diffraction grating 72 in the case of FIG. 8a, and from the diffracting lens 77 in the case of FIG. 8b, in order that the zero order diffracted rays can undergo total reflection. FIG. 8a shows only one example of a prism configuration. It should be noted, at the top of FIG. 8a, that the prism 81 may be placed at a distance from the lens 79 or, as shown at the bottom of the figure, it may be stuck against it or even be manufactured in a single piece with it.

Figure 8B:
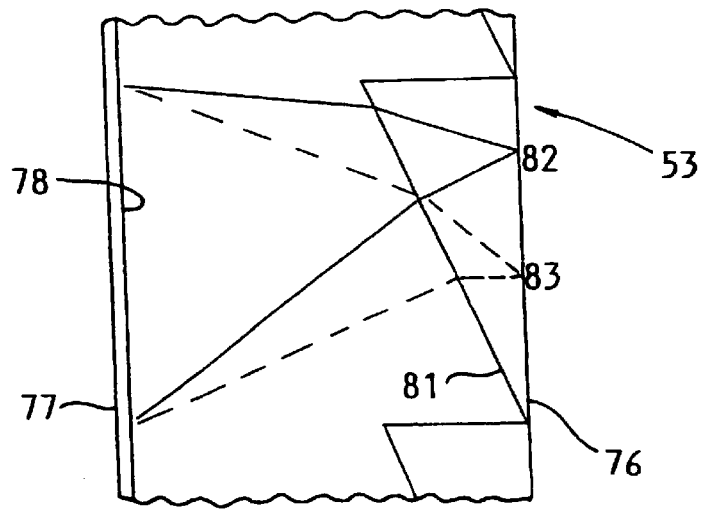

In FIG. 8b, the prism 81 is located downstream from the transparent layer 78 of the storage medium according to the invention illustrated in FIG. 7b.

According to a simple example of an embodiment of these variants, firstly, all the portions of the storage medium extend from one end of it to the other and are parallel to each other and, secondly, the orientation of the functions is the same for all the portions. The first variant then uses a lens grating having convergent cylindrical refracting lenses with parallel axes and a diffraction grating which disperses laterally with respect to the orientation of the said axes (FIG. 7a), while the second variant uses a lens grating with convergent diffracting lenses of identical orientation (FIG. 7b), and the other two variants use in addition a grating of prisms with identical orientations (FIGS. 8a and 8b).

The photosensitive layer is either silver-based, of the type used in a cinematographic film, or electronic, of the type used in a camcorder CCD sensor, when shooting is involved, or like a liquid crystal matrix in a videoprojector when projection is involved. These photosensitive CCD sensors are used to convert the elementary images into signals, either for recording in a magnetic or digital memory or for sending them directly to the projector.

When a silver-based photosensitive layer is used to obtain animated views, it is either just the layer 76 (or respectively 95) carrying the elementary images that moves, or it is the whole storage medium 53 that moves, during the replacement of an image by the next one, and during the shooting (or respectively the projection).

It should be noted that, when the data are in digital form, they may be processed to create special effects. In this case, the elements forming the images are modified. It is also possible to create elements constituting a synthetic image.

For projection, the image data storage medium and the lens are oriented so as to allow a focusing of the stereoscopic image obtained on the screen. The problem of oblique projection has already been dealt with, for example in the patent U.S. Pat. No. 3,802,769.

Two orientations of the storage medium 53 and 53' and the shooting lens 12 and 52' are proposed in FIG. 5. FIG. 6 shows a projection in which the orientation of the storage medium 53, 53' with respect to the projection lens 62, 62' is the same as in the shooting illustrated in FIG. 5.

Even though the large inclination of the rays with respect to the axis of the lens during shooting causes aberrations, such as chromatic aberration, these are corrected or reduced on projection where the said inclination is also considerable.

Figure 9:
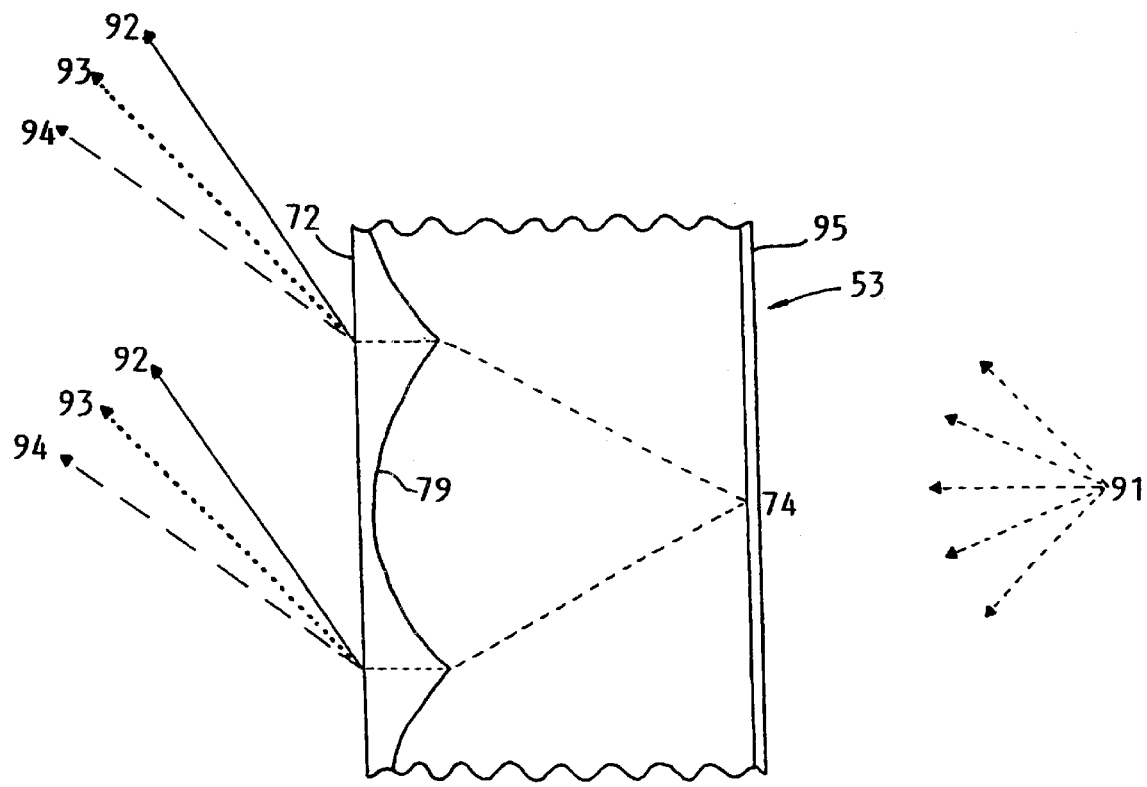
FIG. 9 is a cross-sectional view of a variant of the image data storage system during projection.

During projection (FIG. 9), the upstream side of the layer 95 now carrying the elementary images is irradiated, in general with an ordinary projection lamp 91. The storage medium 53 then behaves, from each elementary image, like a small projector which splits the beam passing through it and in which the rays are deviated according to their wavelength. According to the principle of the reversal of light paths, rays projected in the opposite direction 93 from that of the shooting follow deviations in the storage medium whose form is identical. In this case, the projection lens 62 is placed in the same position as the shooting lens 12 with respect to the storage medium 53. This arrangement makes it possible to project a beam in which each wavelength carries an item of information characteristic of it: a constitutive element of the image and therefore a viewing angle of points in the stereoscopic image. Each wavelength thus carries a part of the information from each image portion. Each elementary image corresponds to a wavelength, the same as in shooting. All the elementary images reconstitute the spectral range of the shooting in each image portion. Thus, the projection reconstructs the image portions from the spectrograms, and therefore from the elementary images.

In other lateral directions 92 and 94, the "small projector" sends other wavelengths which follow the direction 93, wavelengths corresponding to each elementary image 74. The longer wavelengths 92 are deviated more than the shorter wavelengths 94. These other directions are not those of the projection lens 62 and the rays of the corresponding wavelengths are not projected on to the screen 13.

Figure 10A:
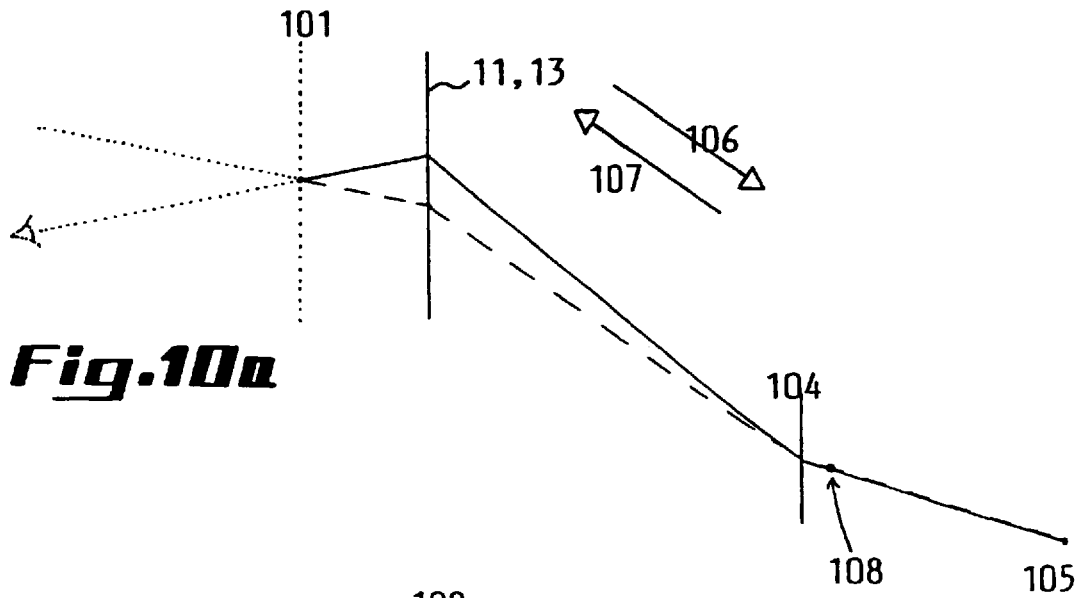
FIGS. 10a, 10b and 10c are plan views of shootings or projections, secondary in 10a and 10c, primary in 10c.
Figure 10B:
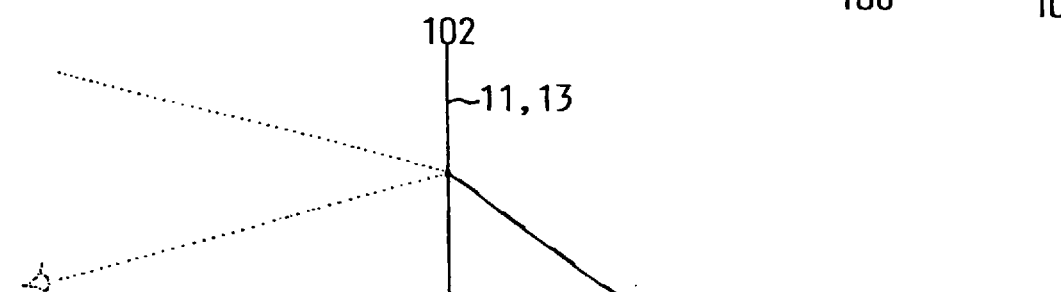
Figure 10C:
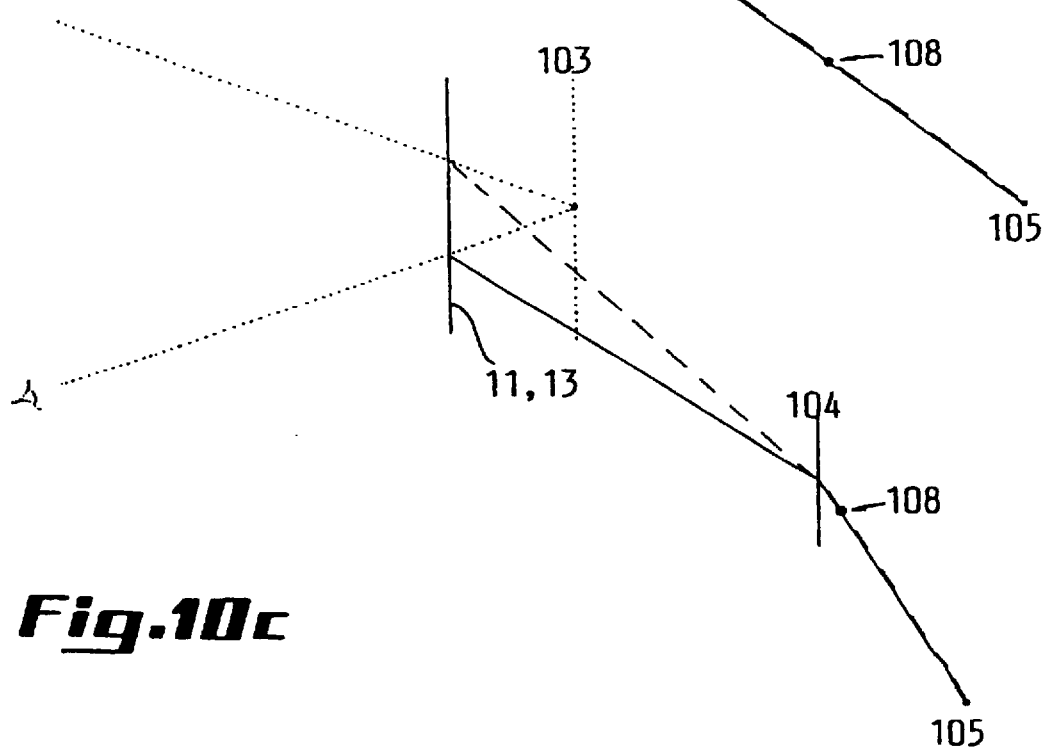

FIGS. 10a, 10b and 10c illustrate both a shooting 106 and a projection 107 depending on whether the rays are propagated towards the right or left in these figures. Represented in FIGS. 10a and 10c are deviations through two diffraction gratings 11 and 104 (or respectively 104 and 13), thus achieving a "secondary" shooting (or respectively a "secondary" projection). The deviation occurs through the primary grating 11 or the screen 13 and the secondary grating 104, the latter being placed between the primary grating or the screen and the lens. The centre of the shooting lens or the projection lens is represented in these figures by the point 108.

The levels denoted by 101, 102 and 103, known as "reference levels", contain object points or theoretical stereoscopic image points corresponding to homologous points 105 of minimum shift.

Depending on whether the secondary grating 104 deviates in the opposite direction to, or in the same direction as, the primary grating 11 or the screen 13, the said reference level is on the opposite side 101 or on the same side 103 of the primary grating or the screen, with respect to the secondary grating 104. In cases where the secondary grating is not used, this reference level 102 is superimposed on the primary grating 11 or on the screen 13. The use of the secondary grating therefore results in a separation of the reference level from the plane of the primary grating 11 or of the screen 13, a separation that increases with a greater dispersion by the secondary grating 104 and as the distance between the said grating 104 and the primary grating or the screen increases.

It is also possible to envisage another case, not shown in FIG. 10, in which the secondary grating deviates in the opposite direction and the deviations are greater here than through the primary grating or the screen.

The constitutive elements of the image obtained by the primary shooting of a scene are shifted with respect to each other and, in the cases illustrated, horizontally with respect to the vertical direction of the stereoscopic image to be obtained. Each of them is partly superimposed on its neighbour. The use of a secondary grating modifies the shift of homologous points. It is possible to observe the position of homologous points corresponding to the object points A and B during a shooting with secondary grating 104 (a 14, a 16, b 14 and b 16 in FIG. 11) or without the secondary grating (a 11, a 13, b 11 and b 13 in FIG. 5). Compared with a primary shooting, the homologous points corresponding to the object point A are nearer to each other with the use of a secondary grating. For their part, the order of the homologous points b is reversed.

During a primary projection (FIG. 12), the stereoscopic image points obtained from these homologous points (a 14, a 16, b 14 and b 16) resulting from a secondary shooting (FIG. 11) are located at A' and B'.

Figure 11:
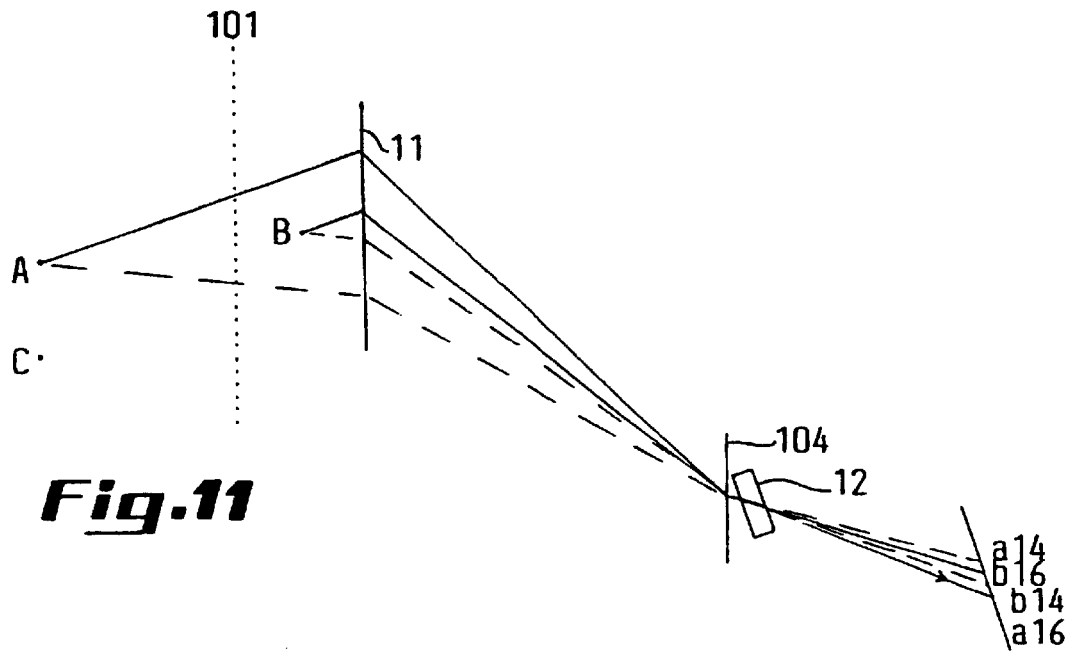
FIG. 11 is a plan view of a secondary shooting with an image data storage system according to the invention.

When the shift between the homologous points corresponding to a stereoscopic image point is modified in this way, the whole series of homologous points undergoes a similar modification, since the displacements affect each constituent element of the image in its entirety. As a result of this, the constituent elements of the image modified in this way reconstitute a stereoscopic image further in front of or further behind the screen when its position is compared with that obtained without the secondary grating when shooting (for this, see the difference in the position of A' between FIGS. 12 and 6). It should be noted that the image recording equipment in FIG. 11 is oriented by taking into account the deviation through the secondary grating, in anticipation of the projection (FIG. 12).

Figure 12:
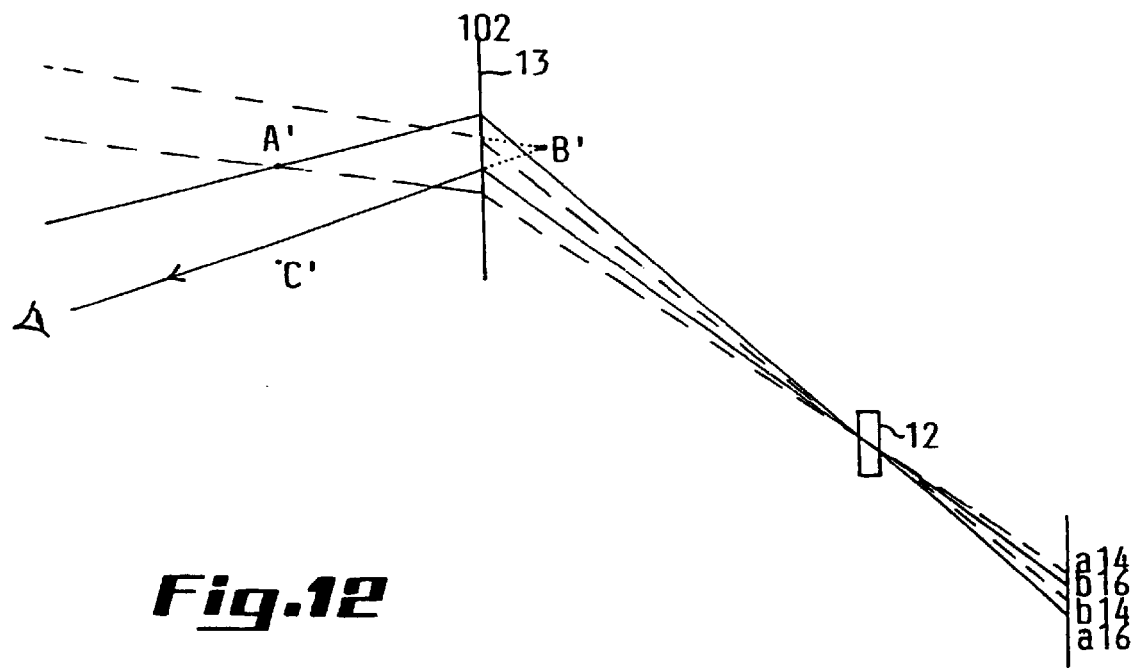
FIG. 12 is a plan view of a primary projection following the secondary shooting shown in FIG. 11.

In the example of FIG. 12, the screen acts as a converging lens for the stereoscopic image point A' and as a diverging lens for the stereoscopic image point B'.

When looking directly through the screen at the constitutive elements formed downstream from the lens, it is possible to carry out a shooting with primary projection (FIG. 1) or a shooting with secondary projection. In the latter case, the secondary grating is placed in the optical path between the primary grating and the screen.

According to the invention, it is possible to use several pieces of equipment for shooting or for projection. In this way, it is possible to produce a stereoscopic image in which the viewer can observe more than one wavelength under certain viewing angles. More than one wavelength radiates in these directions. In visible light, the stereoscopic image obtained is coloured. The use of several storage media also enables the number of viewing angles obtained to be increased.

Figure 13:
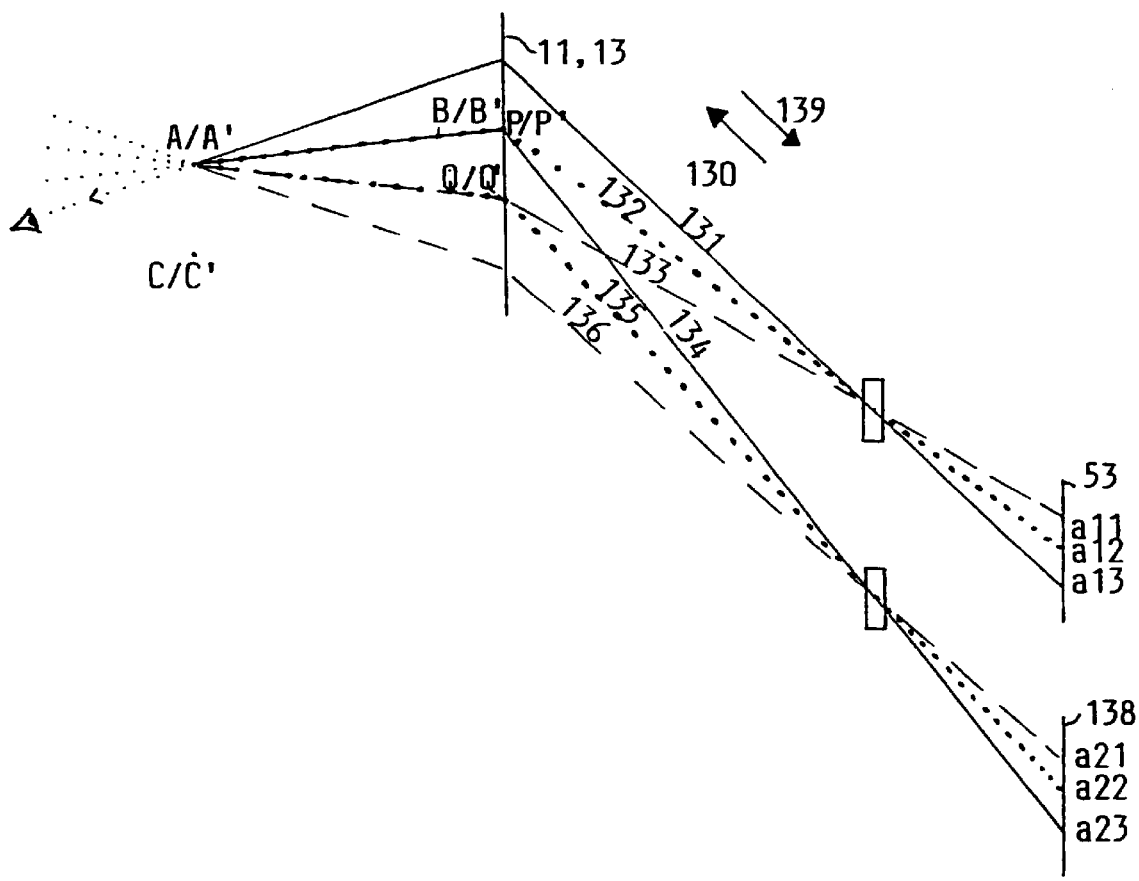
FIG. 13 is a plan view of a primary shooting with two image data storage systems according to the invention and of the primary projection produced with these storage systems.

FIG. 13 shows the sensitising at a 12 and at a 23 of two neighbouring storage media 53, 138 by two rays 132 and 134 coming from an object point A, whose orientations are both A-P before deviation by the primary grating 11. The two image points obtained therefore correspond to the same viewing angle P-A.

With one lens, the same storage medium is sensitised with (homologous) image points of different viewing angles.

With several lenses, different storage media are sensitised with image points of the same viewing angle.

The angular difference between the rays 132 and 134, downstream from the primary grating, corresponds to their difference in deviation through the said primary grating.

Still according to FIG. 13, the rays represented correspond to a predetermined wavelength, for example:

rays 131 and 134 represent a wavelength of 700 nm,
rays 132 and 134 that of 550 nm, and
rays 133 and 136 that of 400 nm.

Wavelengths lying between these three values are not represented.

Figure 14:
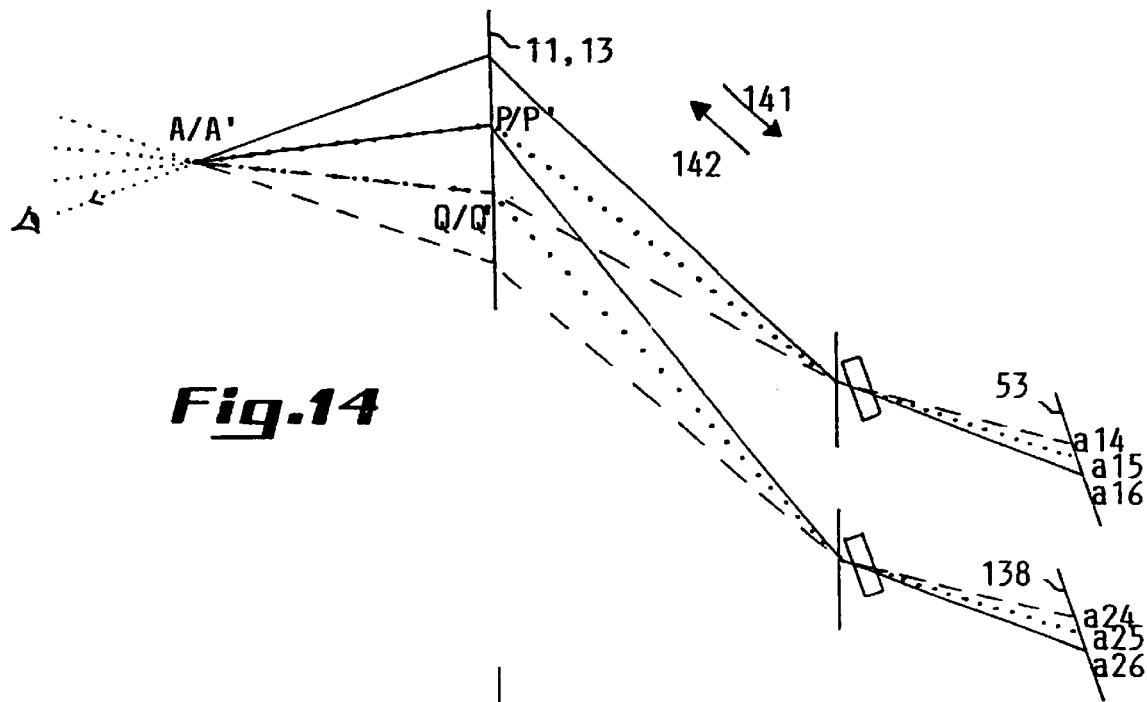
FIG. 14 is a plan view of a secondary shooting and projection with two storage media according to the invention.

Depending on the direction of propagation of the rays, FIGS. 13 and 14 represent a shooting (139, 141) of A towards the storage media 53, 138, and a projection (130, 142) from the storage media 53, 138 towards the eye of the viewer passing through A'.

In addition to the viewing angles common to two neighbouring storage media 53, 138, the storage medium 138 enables viewing angles to be obtained that are characteristic of it. In comparison with the viewing angles obtained by the storage medium 53, the ray 136 and the rays following an intermediate path between rays 135 and 136 enable many additional viewing angles to be obtained thanks to the storage medium 138. The identical pairs of viewing angles are located between, and include, the direction Q-A and P-A.

During projection (130), the ray 132 projected from the storage medium 53 and the ray 134 projected from the storage medium 138 follow the same direction P'-A' after deviation by the screen 13. The angular separation between the rays 132 and 134, upstream from the screen 13, is equal to the difference in their deviation through the said screen.

Each pair of identical viewing angles from the same point of the stereoscopic image causes two rays to appear, each characterised by a wavelength. The viewer observes both wavelengths at this angle, each of them having its own intensity. The colour of this point on the stereoscopic image depends upon the intensities of the two rays. According to this characteristic of the invention, the stereoscopic image obtained in visible light exhibits shades of colours.

The object being shot emits rays according to a predetermined spectral distribution. In visible light, this distribution produces the colour of the object that we see with the naked eye. The projection reconstructs, from each storage medium, each point of the stereoscopic image with rays whose spectral composition is identical to that of the corresponding point on the object being shot. It is possible to consider the wavelength of 550 nm as being, for example, green in colour. If the object point A emits the wavelength of 550 nm (green) with a greater intensity than it emits the wavelength of 700 nm (red), the storage medium 53 will be more strongly acted on by the ray 132 (550 nm) than the storage medium 138 by the ray 134 (700 nm). On projection, the viewing angle P'-A' will exhibit a greater intensity for the wavelength of 550 nm and the colour of the point A' on the stereoscopic image obtained will tend to be green in the direction P'-A'.

The pair of wavelengths may make some points on the stereoscopic image appear somewhat green and others somewhat red. Other colours, such as yellow or orange, result from the superposition of these two radiations. The colour results from additive mixing of spectral colours, according to the chromaticity diagram well known to one skilled in the art.

The quality of the colour obtained improves as the number of storage media increases, and this leads to an enhanced visual comfort. For the same viewing angle of a point of the stereoscopic image, increasing the number of wavelengths makes it possible to get closer to natural colours.

In this case, and according to our example, when the object is green to the naked eye, the stereoscopic image obtained has a higher proportion of green viewing angles compared with an object which is of another colour to the naked eye.

According to the invention, the spectral range to which each storage medium is sensitive may be different from one storage medium to another. For example, that of the storage medium 53 may be located between 400 and 550 nm and that of the storage medium 138 between 550 and 700 nm.

When a secondary shooting or a secondary projection is carried out, a secondary grating is placed in the optical path between the primary grating or the screen and each lens.

Adjustment of the projection is achieved by correctly choosing the position and orientation of each item of projection equipment and, in the case of a secondary projection, the position and orientation of each secondary grating.

A secondary shooting or projection may be carried out through a secondary grating common to the all the lenses.

Figure 15:
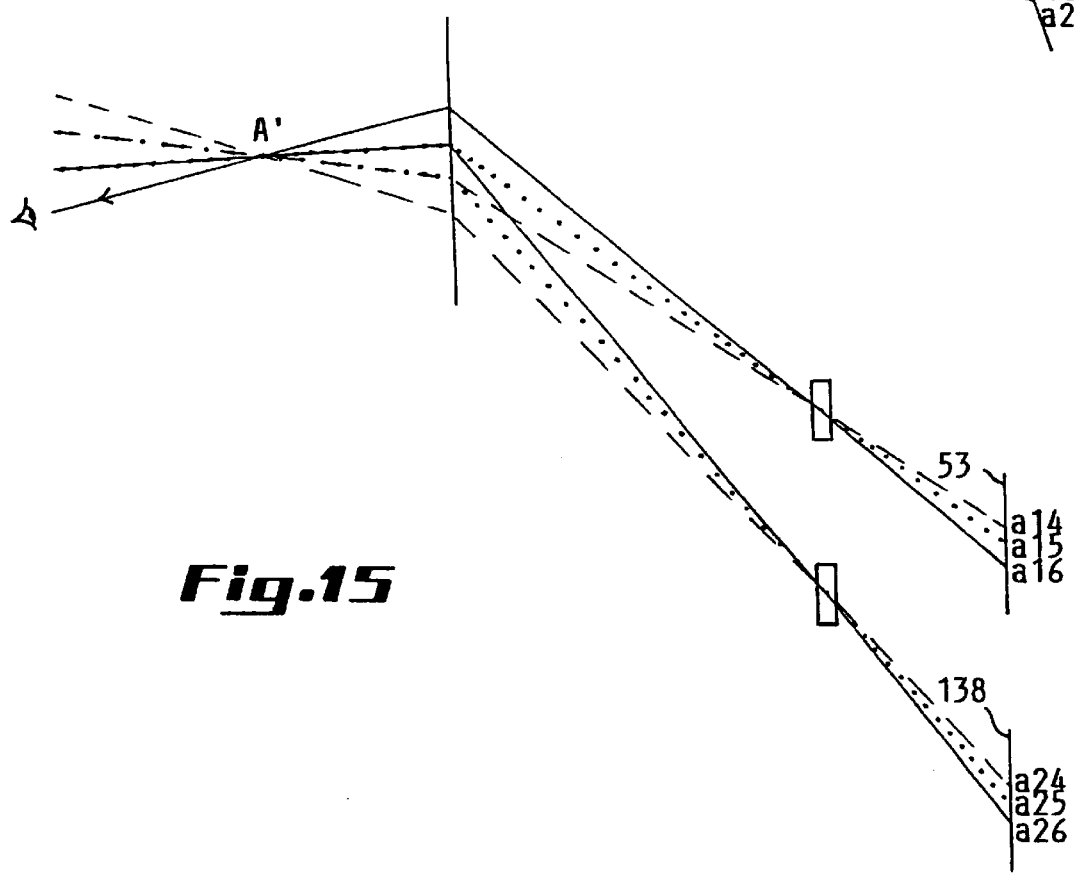
FIG. 15 is a plan view of a primary projection with two storage media following the secondary shooting shown in FIG. 14.

FIG. 15 illustrates a primary projection following a secondary shooting like that carried out in FIG. 14.

When animated images are projected, the different items of projection equipment must be synchronised with each other.

Figure 16:
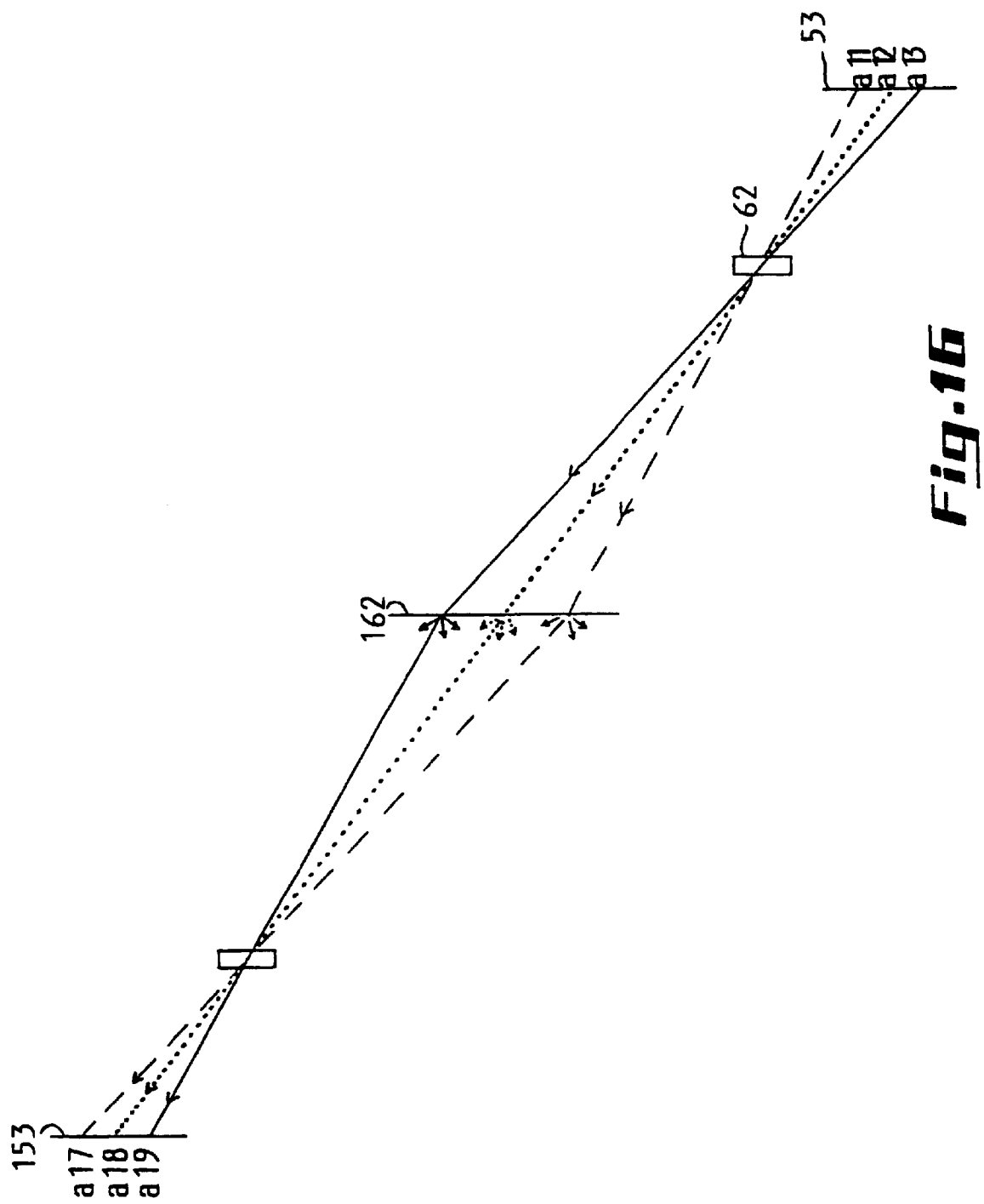
FIG. 16 is a plan view of the operating of transferring the constitutive elements of the image from one storage medium according to the invention to another one.

According to one method of the invention, the stereoscopy of the image to be obtained is reversed, i.e. the parallax is reversed. For this operation, the orthoscopic three-dimensional effect becomes pseudoscopic and vice versa. As illustrated in FIG. 16, constitutive elements are transferred to another storage medium 153 where, in comparison with the initial storage medium 53, the constitutive elements have been reversed in the left-right direction. This operation makes it possible to reverse the parallax of the stereoscopic image to be obtained.

In order to achieve this transfer, the first step is to carry out a so-called "transfer" projection, from the initial storage medium 53 on to a translucent scattering surface 162, of the constitutive elements of the image reconstructed from the elementary images, and the second step is to carry out a so-called "transfer" shooting, from the other side of the said scattering surface, of the constitutive elements on to a storage medium 153, such as that described in this invention, so as to form on it new elementary images.

The transfer operation is carried out separately for each storage medium.

After transfer, projection on to the screen from the storage medium 153 is carried out, according to the projection method described previously in this invention (FIG. 17). The angle made with the translucent scattering surface 162, at which the transfer shooting is carried out, is chosen as a function of the required angle of projection on to the screen.

Figure 17:
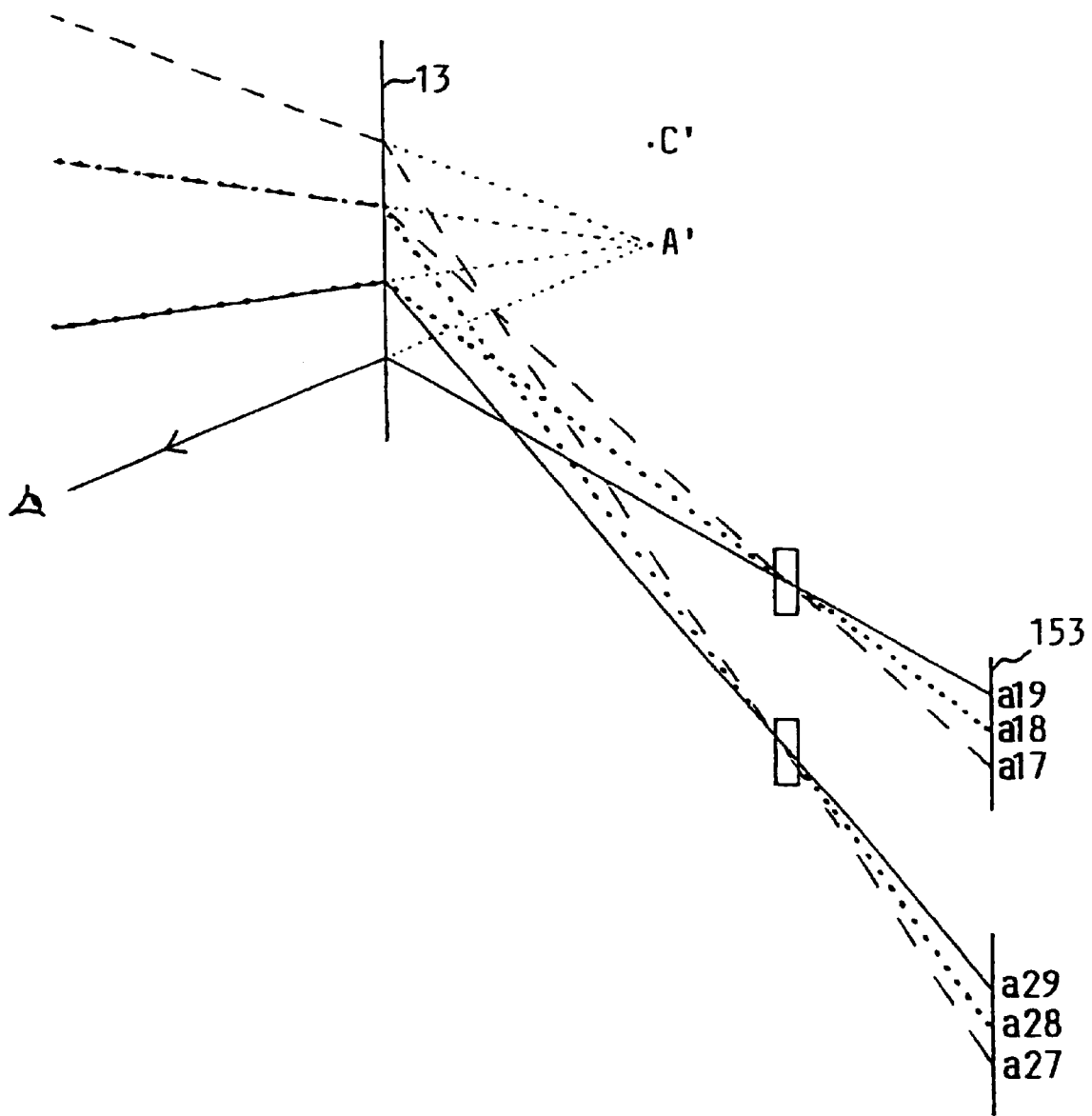
FIG. 17 is a plan view of a primary projection with two storage media according to the invention, after transfer.

By comparing FIGS. 13 and 17, it can be seen that the real points A' and C' have become virtual, that their order is reversed in the left-right direction and that the pairs of identical viewing angles are reconstructed after the transfer. Just as for the points A' and C', the left-right direction and the stereoscopy of the whole image are reversed.

According to the invention, it is also possible to deviate the transfer projection and/or the transfer shooting by placing in the optical path an additional diffraction grating which disperses laterally, as described previously in this invention.

Figure 18:
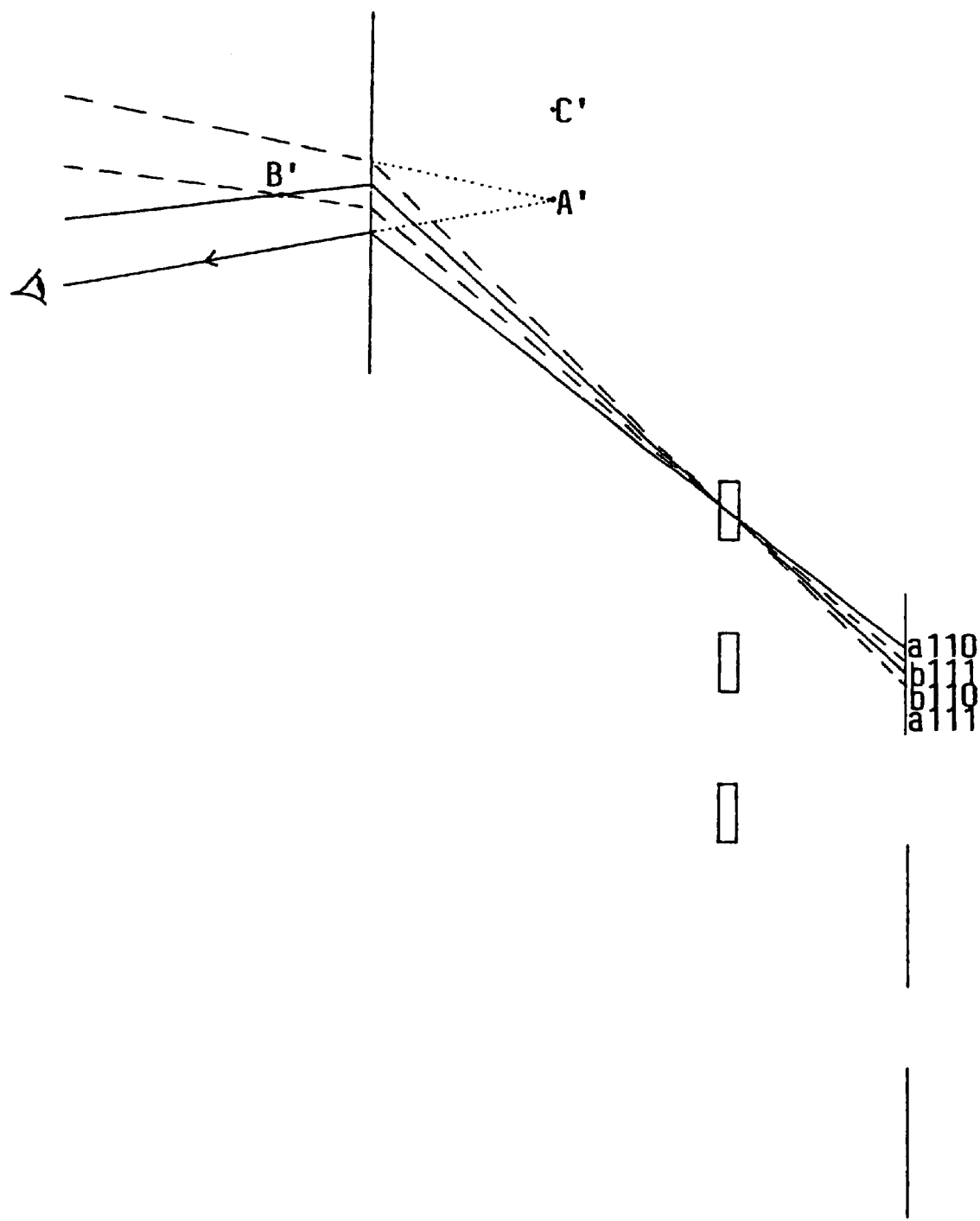
FIG. 18 is a plan view of a primary projection with three storage media according to the invention, after transfer and when a secondary shooting has been carried out.

In addition, in conformity with the present invention, the different possible embodiments described, with the use of a storage medium or storage media, may be combined with each other. The following may be mentioned as an example: the achievement of a secondary shooting with several storage media, followed by the transfer operation and a primary projection: FIG. 18 shows an example of a stereoscopic image obtained with three storage media. Here, the rays coming from the second and third storage media are not shown, in order to make it easier to interpret the drawing.

It should be understood that all the primary, secondary or other gratings used according to the present invention may be of the type described in connection with the grating 11 and that they may be similar to, or different from, each other in the same device.

It remains to point out, of course, that this invention is not limited to the examples of embodiments described and introduced, but that it embraces all the variants that lie within the scope of the appended claims.

I claim:

1. A method for producing a stereoscopic image with horizontal parallax, comprising:

diffracting electromagnetic rays emitted by an object to provide a first dispersion of dispersed electromagnetic rays in which a lateral deviation of the rays emitted by the object is obtained in a first deviation direction;

collecting at least part of the dispersed electromagnetic rays by shooting the object with at least one lens to provide an image;

projecting the image through a screen facility; and diffracting electromagnetic rays emitted during projection to provide a second dispersion and scattering the second dispersion by the at least one screen facility to form a stereoscopic image of the object in which a lateral deviation of He rays emitted during projection is obtained in a second deviation direction.

2. The method according to claim 1, wherein the first dispersion comprises a formation of constitutive elements of an image which are, per wavelength, deviated laterally by different amounts.

3. The method according to claim 2, wherein the first deviation direction and the second deviation direction are the same.

4. The method according to claim 1, wherein the first deviation direction and the second deviation direction are opposite to one another.

5. The method according to claim 1, wherein diffracting to provide the second dispersion and scattering take place successively.

6. The method according to claim 1, wherein diffracting to provide the second dispersion and scattering take place simultaneously.

7. The method according to claim 1, wherein the lateral deviation of the rays emitted during projection takes place, in the second dispersion, about parallel dispersion axes, and wherein scattering is carried out along lines perpendicular to the parallel dispersion axes.

8. The method according to claim 1, wherein projecting is carried out by the at least one lens.

9. The method according to claim 1, further comprising receiving the image as image data on at least one data storage facility so that projecting the image may be carried out subsequently.

10. The method according to claim 9, wherein receiving the image as image data comprises:
dividing constitutive elements of the image into image portions of a predetermined size dependent on definition of the stereoscopic image to be obtained;
isolating, in each image portion, an elementary image for each wavelength; and
irradiating, in a separate action by each respective elementary image, a storage facility including a data storage medium which is a photosensitive layer and which receives the image data.

11. The method according to claim 10, wherein isolating the elementary images comprises:
diffracting electromagnetic rays collected by the at least one lens to provide a third dispersion of dispersed electromagnetic rays in which a lateral deviation of the rays is obtained; and
focusing the dispersed electromagnetic rays onto the photosensitive layer.

12. The method according to claim 11, wherein isolating the elementary images further comprises diffracting electromagnetic rays to provide a fourth dispersion of dispersed electromagnetic rays in which a deviation of the rays is obtained in a direction opposite to that of the lateral deviation in the third dispersion and the deviation of the rays is characterized by a greater deviation of short wavelengths so that isolation of the elementary images is accentuated.

13. The method according to claim 10, further comprising:
projecting the elementary images stored as image data on the at least one data storage facility by irradiating the at least one data storage facility with a source of electromagnetic rays or wavelengths corresponding to those of the image; and
reconstructing the constitutive elements of the image from the projected elementary images employing the at least one screen facility.

14. The method according to claim 10, further comprising, after the image data is received on the data storage medium,
transfer projecting the image data by irradiating the at least one data storage facility with a source of electromagnetic rays or wavelengths corresponding to those of the image to transfer the image data from the data storage medium onto a translucent scattering facility to provide projected elementary images;
reconstructing the constitutive elements of the image from the projected elementary images;
transfer shooting onto an additional data storage medium which allows a subsequent additional projecting step with formation of new elementary images; and
projecting the transfer shooting through the at least one screen facility.

15. The method according to claim 9, further comprising:
converting the image data received on the at least one data storage facility into electromagnetic signals; and
reconverting the electromagnetic signals into image data for projecting the image.

16. An image data storage medium for implementation of the method according to claim 9.

17. The method according to claim 1, further comprising adjusting spatial separation between the stereoscopic image and the at least one screen facility by including at least one additional diffracting of electromagnetic rays to correspondingly provide additional dispersion of dispersed electromagnetic rays in which a lateral deviation of the rays is obtained.

18. A device for the implementation of the method according to claim 1, comprising:
a first diffraction grating providing for a first dispersion of electromagnetic rays emitted by an object (A, B, C) according to a first deviation direction;
a lens effective to collect at least a part of the dispersed electromagnetic rays; and
a screen facility through which the electromagnetic rays coming from the lens undergo a second dispersion and a scattering, the second dispersion producing a lateral deviation of the rays coming from the lens according to a second deviation direction.

19. The device according to claim 18, wherein the first diffraction grating consists of equidistant parallel straight lines/fringes which form the first parallel dispersion axes.

20. The device according to claim 18, wherein the screen facility is composed of a second diffraction grating consisting of equidistant parallel straight lines/fringes which form second dispersion axes and, one of upstream or downstream from the second diffraction grating, a lineal scatterer having lines which extend in a direction perpendicular to the second dispersion axes.

21. The device according to claim 18, wherein the screen facility is a holographic facility providing for both the second dispersion and the scattering.

22. The device according to claim 21, wherein the holographic facility is a transmitted-light hologram which produces at least a part of an image of a vertical line when there is a horizontal angle between a reconstruction beam and an image beam.

23. Optical equipment for the implementation of the method according to claim 1, comprising:
a first diffraction grating providing for a first dispersion of electromagnetic rays emitted by an object (A, B, C) about parallel first dispersion axes, which produces a lateral deviation of the electromagnetic rays emitted by an object according to a first deviation direction;
at least one lens effective to collect at least a part of the dispersed electromagnetic rays;
at least one image data storage medium effective to receive the electromagnetic rays collected by the at least one lens and store image data, and subsequently effective to make possible a projection, through at least one projection lens, of image data transmitted by the collected electromagnetic rays; and
a screen facility through which the electromagnetic rays coming from the at least one projection lens undergo a second dispersion and a scattering, the second dispersion producing a lateral deviation of the electromagnetic rays coming from the at least one projection lens according to a second deviation direction.

24. The device according to claim 23, wherein each image data storage medium comprises:
means for dividing the constitutive elements of the image into image portions of predetermined size depending on the definition of the stereoscopic image to be obtained;
means for dispersion by diffraction of the electromagnetic rays collected by the at least one lens, with a lateral deviation of the electromagnetic rays about parallel third dispersion axes; and means for focusing the rays thus dispersed onto a photosensitive layer.

25. The device according to claim 24, wherein each image data storage medium comprises, per image portion, a convergent cylindrical refracting lens which is associated with a diffraction grating serving as the means for dispersion and which performs a function of convergence with the same orientation as the dispersion provided by the diffraction grating, the photosensitive layer being positioned at a distance effective to focus on it the electromagnetic rays processed by the at least one lens and the diffraction grating.

26. The device according to claim 25, wherein each image data storage medium further comprises, per image portion, a prism positioned so as to disperse laterally in order to one of attenuate or rectify a lateral deviation about a third dispersion axes, and to increase the dispersion by the diffraction grating.

27. The device according to claim 26, wherein the prism is positioned downstream from the diffraction grating in such a way as to reflect by total reflection zero-order diffracted rays.

28. The device according to claim 24, wherein each image data storage medium comprises, per image portion, a convergent diffracting lens which provides for both dispersion on the same side and focusing onto the photosensitive layer.

29. The device according to claim 28, wherein each image data storage medium further comprises, per image portion, a prism positioned so as to disperse laterally in order to one of attentuate or rectify the lateral deviation about the third dispersion axes, and to increase the dispersion by the diffraction grating.

30. The device according to claim 29, wherein the prism is positioned downstream from the convergent diffracting Ions, in such a way as to reflect by total reflection zero-order diffracted rays.

31. The device according to claim 24, wherein each image data storage medium is formed by a grating of storage medium portions arranged in bands extending from one end to another end of the image data storage medium and parallel to each other, so that the orientation of functions of each storage medium portion is identical in all of the bands.

32. The device according to claim 23, wherein the first diffraction grating consists of equidistant parallel straight lines/fringes which form the first dispersion axes.

33. The device according to claim 23, wherein the screen facility is composed of a second diffraction grating consisting of equidistant parallel straight lines/fringes which form the second dispersion axes and, one of upstream or downstream from the second diffraction grating, a lineal scatterer whose lines extend along a direction perpendicular to the second dispersion axes.

34. The device according to claim 23, wherein the screen facility is a holographic facility providing for both the second dispersion and the scattering.

35. The device according to claim 34, wherein the holographic facility is a transmitted-light hologram which produces at least a part of an image of a vertical line when there is a horizontal angle between a reconstruction beam and a image beam.

36. A screen for the implementation of the method according to claim 1.

* * * * *